US011981134B2

United States Patent

(12) United States Patent
Dogome

(10) Patent No.: US 11,981,134 B2
(45) Date of Patent: May 14, 2024

(54) LIQUID DISCHARGE HEAD AND RECORDING DEVICE

(71) Applicant: KYOCERA CORPORATION, Kyoto (JP)

(72) Inventor: Kazuki Dogome, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 134 days.

(21) Appl. No.: 17/788,296

(22) PCT Filed: Dec. 25, 2020

(86) PCT No.: PCT/JP2020/049008

§ 371 (c)(1),
(2) Date: Jun. 23, 2022

(87) PCT Pub. No.: WO2021/132676

PCT Pub. Date: Jul. 1, 2021

(65) Prior Publication Data

US 2023/0029887 A1 Feb. 2, 2023

(30) Foreign Application Priority Data

Dec. 27, 2019 (JP) ................................ 2019-239886

(51) Int. Cl.
*B41J 2/14* (2006.01)

(52) U.S. Cl.
CPC .. *B41J 2/14201* (2013.01); *B41J 2002/14411* (2013.01)

(58) Field of Classification Search
CPC .......... B41J 2/14201; B41J 2002/14411; B41J 2002/14225; B41J 2002/14306; B41J 2002/14459; B41J 2/14209; B41J 2/1623; B41J 2/1626; B41J 2/1609
See application file for complete search history.

(56) References Cited

U.S. PATENT DOCUMENTS 7,360,875 B2 * 4/2008 Terakura .............. B41J 2/14209
347/71
2006/0024477 A1 2/2006 Ito

FOREIGN PATENT DOCUMENTS

| | | | |
|---|---|---|---|
| EP | 1506865 | A1 | 2/2005 |
| EP | 1905593 | A1 | 4/2008 |
| JP | 2003226019 | A | 8/2003 |
| JP | 200559399 | A | 3/2005 |

* cited by examiner

*Primary Examiner* — Lisa Solomon

(74) *Attorney, Agent, or Firm* — HAUPTMAN HAM, LLP

(57) ABSTRACT

A liquid discharge head includes a base plate, a cavity plate located on the base plate and including a cavity, and a piezoelectric actuator substrate located on the cavity plate. The cavity plate includes: a first groove located inside a contact region with the piezoelectric actuator substrate and configured to release an adhesive for bonding the cavity plate and the piezoelectric actuator substrate; and a second groove located in a manner to surround the contact region with the piezoelectric actuator substrate and configured to release the adhesive. The base plate includes a third groove configured to open the first groove to the atmosphere. The third groove is configured to communicate between the first groove and the outside through a first hole communicating with the first groove and a second hole located outside the contact region of the cavity plate and the piezoelectric actuator substrate.

12 Claims, 15 Drawing Sheets

LIQUID DISCHARGE HEAD AND RECORDING DEVICE

RELATED APPLICATIONS

The present application is a National Phase of International Application Number PCT/JP2020/049008, filed Dec. 25, 2020, and claims priority based on Japanese Patent Application No. 2019-239886, filed Dec. 27, 2019.

TECHNICAL FIELD

The disclosed embodiments relate to a liquid discharge head and a recording device.

BACKGROUND ART

Inkjet printers and inkjet plotters that utilize an inkjet recording method are known as printing apparatuses. A liquid discharge head for discharging liquid is mounted in a printing apparatus using such an inkjet method.

Further, in such a liquid discharge head, a pressure chamber, a manifold, a nozzle, and a channel unit configured to form an ink channel connecting them are configured by layering a plurality of plates including openings, holes, or the like, for forming a pressure chamber, or the like. Then, among the plurality of plates, a cavity plate configured to form a pressure chamber is disposed with an actuator unit configured to change the volume of the pressure chamber and discharge ink from the nozzle.

It is known that such a channel unit and an actuator unit may be bonded to each other by an adhesive and layered to each other, and a release groove for releasing the excess adhesive is formed along the outer peripheral part of the plate.

CITATION LIST

Patent Literature

Patent Document 1: JP 2005-59399 A

SUMMARY OF INVENTION

A liquid discharge head according to an aspect of an embodiment includes: a base plate; a cavity plate located on the base plate and including a cavity; and a piezoelectric actuator substrate located on the cavity plate. The cavity plate includes: a first groove located inside a contact region with the piezoelectric actuator substrate and configured to release an adhesive for bonding the cavity plate and the piezoelectric actuator substrate; and a second groove located in a manner to surround the contact region with the piezoelectric actuator substrate and configured to release the adhesive. The base plate includes a third groove configured to open the first groove to an atmosphere. The third groove is configured to communicate between the first groove and an outside through a first hole communicating with the first groove and a second hole located outside the contact region of the cavity plate and the piezoelectric actuator substrate.

DESCRIPTION OF EMBODIMENTS

Figure 1:
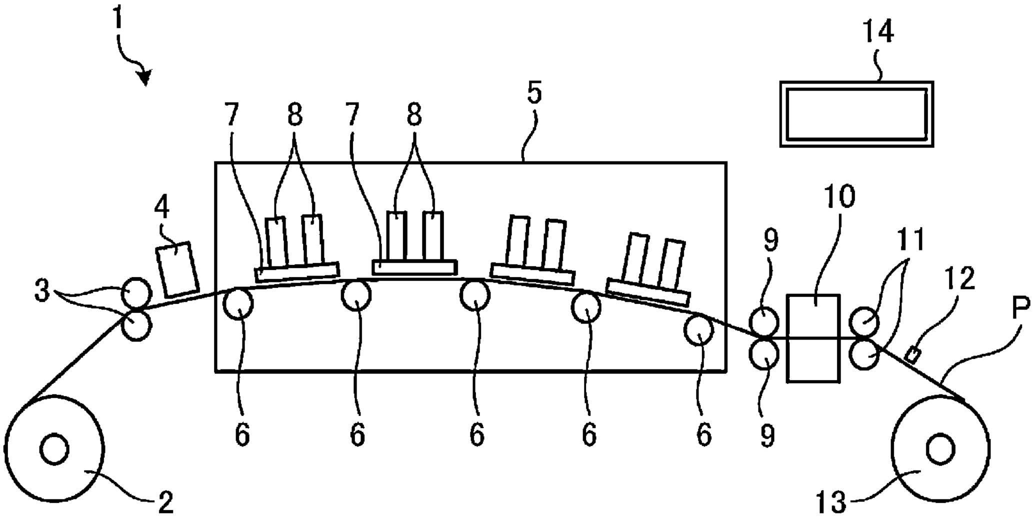
FIG. 1 is a front view schematically illustrating an overall front of a printer according to an embodiment.

Embodiments of a liquid discharge head and a recording device disclosed in the present application will be described in detail below with reference to the accompanying drawings. Note that the invention according to the present application is not limited by the embodiments described below.

Inkjet printers and inkjet plotters utilizing an inkjet recording method are known as printing apparatuses. A liquid discharge head for discharging liquid is mounted in the printing apparatus using such an inkjet method.

Further, in such a liquid discharge head, a pressurizing chamber, a manifold, a nozzle, and a channel member configured to form an ink channel connecting them are configured by layering a plurality of plates including openings, holes, or the like, for forming the pressurizing chamber, or the like. Then, among the plurality of plates, a cavity plate configured to form the pressurizing chamber is disposed with a piezoelectric actuator substrate configured to change the volume of the pressurizing chamber and discharge ink from the nozzle.

The plurality of plates constituting the channel member and the piezoelectric actuator substrate may be bonded to each other with an adhesive and layered to each other. For example, when the piezoelectric actuator substrate is bonded to the cavity plate with an adhesive, it is known that an actuator mounting area of the cavity plate is surrounded by a release groove to prevent the adhesive from overflowing from each plate. Generally, the release groove is formed by half-etching each plate in the thickness direction.

For example, in order to prevent the adhesive from entering the pressurizing chamber provided in the cavity plate, an adhesive release groove may be provided between the pressurizing chambers located on the surface of the cavity plate (a contact region with the piezoelectric actuator substrate). In this case, since the pressurizing chamber is covered with the piezoelectric actuator substrate, it is necessary to insert a release groove provided between the pressurizing chambers and connected to the outside in order to discharge the gas generated when the cavity plate and the piezoelectric actuator substrate are bonded to each other.

For example, the cavity plate may be half-etched from the back surface in order to insert the release groove provided between the pressurizing chambers and connected to the outside, and a path for inserting the release groove provided between the pressurizing chambers and connected to the outside may be secured. At this time, there is a possibility that the release groove provided on the surface of the cavity plate is divided by the half-etching process, the half-etching process for securing a path for inserting the release groove provided between the pressurizing chambers and connected to the outside. When the adhesive that does not fit in the release groove surrounding the actuator mounting region leaks from between the plates and runs on the piezoelectric actuator substrate, it may cause processing failure.

Therefore, in view of such problems, it is necessary to take sufficient measures to prevent the adhesive bonding between the units from overflowing.

Printer Configuration

Figure 2:
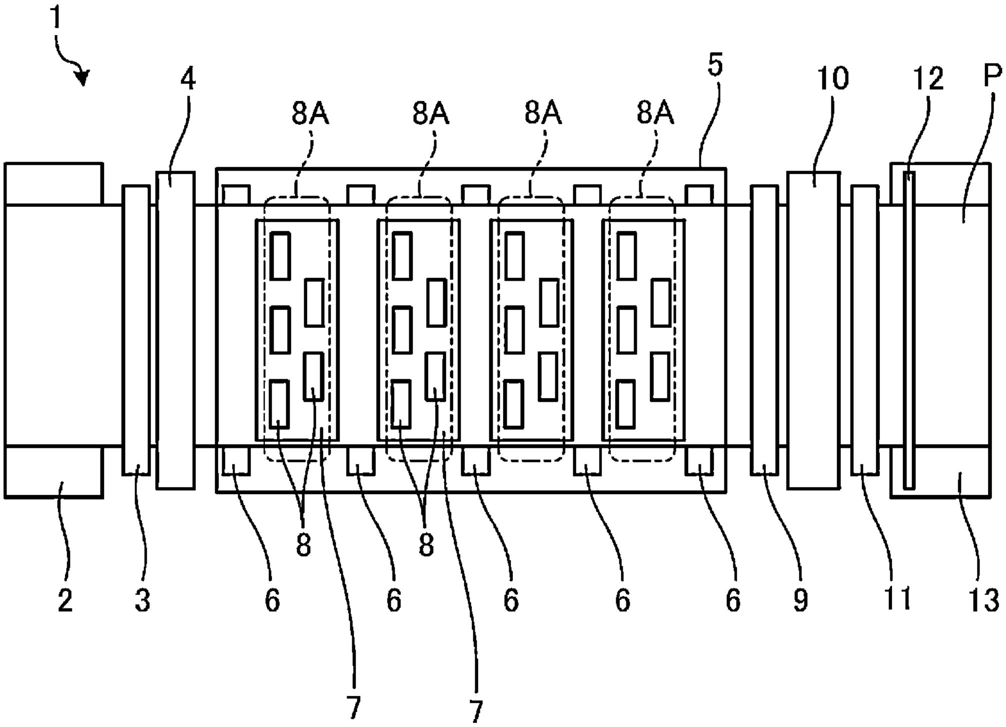
FIG. 2 is a plan view schematically illustrating an overall plan of a printer according to an embodiment.

Using FIGS. 1 and 2, a description will be given of an overview of a printer 1 serving as an example of a recording device according to an embodiment. FIG. 1 is a front view schematically illustrating an overall front of a printer 1 according to an embodiment. FIG. 2 is a plan view schematically illustrating an overall plan of a printer 1 according to an embodiment.

As illustrated in FIG. 1, the printer 1 includes a paper feed roller 2, guide rollers 3, an applicator 4, a head case 5, a plurality of transport rollers 6, a plurality of frames 7, a plurality of liquid discharge heads 8, transport rollers 9, a dryer 10, transport rollers 11, a sensor 12, and a collection roller 13.

Furthermore, the printer 1 includes a controller 14 configured to control each part of the printer 1. The controller 14 controls the operation of the paper feed roller 2, the guide rollers 3, the applicator 4, the head case 5, the plurality of transport rollers 6, the plurality of frames 7, the plurality of liquid discharge heads 8, the transport rollers 9, the dryer 10, the transport rollers 11, the sensor 12, and the collection roller 13.

By landing droplets on a printing sheet P, the printer 1 records images and characters on the printing sheet P. The printing sheet P is wound around the paper feed roller 2 in a drawable state before use. The printer 1 conveys the printing sheet P from the paper feed roller 2 to the inside of the head case 5 via the guide rollers 3 and the applicator 4.

The applicator 4 uniformly applies a coating agent over the printing sheet P. With surface treatment thus performed on the printing sheet P, the printing quality of the printer 1 can be improved.

The head case 5 houses the plurality of transport rollers 6, the plurality of frames 7, and the plurality of liquid discharge heads 8. The inside of the head case 5 is formed with a space separated from the outside except for a part connected to the outside such as parts where the printing sheet P enters and exits.

As required, the controller 14 controls at least one of controllable factors of the internal space of the head case 5, such as temperature, humidity, and air pressure. The transport roller 6 convey the printing sheet P to the vicinity of the liquid discharge heads 8, inside the head case 5.

The frames 7 are rectangular flat plates, and are positioned above and close to the printing sheet P conveyed by the transport rollers 6. As illustrated in FIG. 2, the plurality of frames 7 (e.g., four) are provided inside the head case 5 such that the longitudinal direction thereof is orthogonal to the conveying direction of the printing sheet P. The plurality of frames 7 are disposed at predetermined intervals along the conveying direction of the printing sheet P.

In the following description, the conveying direction of the printing sheet P may be referred to as "sub scanning direction", and the direction orthogonal to the sub scanning direction and parallel to the printing sheet P may be referred to as "main scanning direction".

Liquid, for example, ink, is supplied to the liquid discharge heads 8 from a liquid tank (not illustrated). Each liquid discharge head 8 discharges the liquid supplied from the liquid tank.

The controller 14 controls the liquid discharge heads 8 based on data of an image, characters, or the like to discharge the liquid toward the printing sheet P. The distance between each liquid discharge head 8 and the printing sheet P is, for example, approximately 0.5 to 20 mm.

Each of the liquid discharge heads 8 is fixed to the frame 7. For example, each of the liquid discharge heads 8 is fixed to the frame 7 at both end portions in the longitudinal direction. Each of the liquid discharge heads 8 is fixed to the frame 7 such that its longitudinal direction is parallel to the main scanning direction.

That is, the printer 1 according to the embodiment is a so-called line printer in which the liquid discharge heads 8 are fixed inside the printer 1. Note that the printer 1 according to the embodiment is not limited to a line printer and may also be a so-called serial printer.

A serial printer is a printer employing a method of alternately performing: an operation of recording while moving the liquid discharge heads 8 in a manner to reciprocate or the like in a direction intersecting (e.g., substantially orthogonal to) the conveying direction of the printing sheet P; and an operation of conveying the printing sheet P.

As illustrated in FIG. 2, the plurality of (e.g., five) liquid discharge heads 8 are provided in one frame 7. FIG. 2 illustrates an example in which two liquid discharge heads 8 are arranged in front of the sub scanning direction and three liquid discharge heads 8 are arranged behind the sub scanning direction, and the liquid discharge heads 8 are arranged in the sub scanning direction such that the centers of the liquid discharge heads 8 do not overlap with each other.

The plurality of liquid discharge heads 8 provided in one frame 7 form a head group 8A. Four head groups 8A are positioned along the sub scanning direction. The liquid discharge heads 8 belonging to the same head group 8A are supplied with ink of the same color. As a result, the printer 1 can perform printing with four colors of ink using the four head groups 8A.

The colors of the ink discharged from the respective head groups 8A are, for example, magenta (M), yellow (Y), cyan (C), and black (K). The controller 14 can print a color image on the printing sheet P by controlling the respective head groups 8A to discharge the plurality of colors of ink onto the printing sheet P.

Note that a surface treatment may be performed on the printing sheet P, by discharging a coating agent from the liquid discharge head 8 onto the printing sheet P.

Furthermore, the number of the liquid discharge heads 8 included in one head group 8A and the number of the head groups 8A mounted in the printer 1 can be changed as appropriate in accordance with printing targets and printing conditions. For example, when the color to be printed on the printing sheet P is a single color and the range of the printing can be covered by a single liquid discharge head 8, only a single liquid discharge head 8 may be provided in the printer 1.

The printing sheet P thus subjected to the printing process inside the head case 5 is conveyed by the transport rollers 9 to the outside of the head case 5, and passes through the inside of the dryer 10. The dryer 10 dries the printing sheet P after the printing process. The printing sheet P thus dried by the dryer 10 is conveyed by the transport rollers 11 and then collected by the collection roller 13.

In the printer 1, by drying the printing sheet P with the dryer 10, it is possible to suppress bonding, or rubbing of undried liquid, between the printing sheets P overlapped with each other and rolled at the collection roller 13.

The sensor 12 includes a position sensor, a speed sensor, a temperature sensor, or the like. Based on information from the sensor 12, the controller 14 can determine the state of each part of the printer 1 and control each part of the printer 1.

In the above-described printer 1, the printing sheet P is used as the printing target (i.e., the recording medium), but the printing target in the printer 1 is not limited to the printing sheet P, and a rolled cloth or the like may be used as the printing target.

Furthermore, instead of directly conveying the printing sheet P, the printer 1 described above may have a configuration in which the printing sheet P is put on a conveyor belt and conveyed. By using the conveyor belt, the printer 1 can perform printing on a sheet of paper, a cut cloth, wood, a tile, or the like as a printing target.

Furthermore, the printer 1 described above may discharge a liquid containing electrically conductive particles from the liquid discharge heads 8, printing a wiring pattern or the like of an electronic device.

Furthermore, the printer 1 described above may discharge liquid containing a predetermined amount of liquid chemical agent or liquid containing the chemical agent from the liquid discharge heads 8 onto a reaction vessel or the like to produce chemicals.

The printer 1 described above may also include a cleaner for cleaning the liquid discharge heads 8. The cleaner cleans the liquid discharge heads 8 by, for example, a wiping process or a capping process.

The wiping process is, for example, a process of using a flexible wiper to rub a second surface 21*b* (see FIG. 6) of a channel member 21 (see FIG. 3), which is an example of a surface of a portion from which a liquid is discharged, thereby removing the liquid attached to the second surface 21*b*.

The capping process is a process for removing clogging on discharge holes 63 (see FIG. 4) by covering, with a cap, the portion where the liquid is discharged, and repeating the discharging of the liquid. First, a cap is provided in a manner to cover the second surface 21*b* of the channel member 21 which is an example of the portion from which the liquid is discharged (this process is referred to as capping). This forms a substantially sealed space between the second surface 21*b* and the cap. The discharge of liquid is then repeated in such a sealed space. Consequently, this enables a liquid having a viscosity higher than that in the normal state, foreign matter, or the like that has clogged the discharge hole 63 to be removed.

Configuration of Liquid Discharge Head

Figure 3:
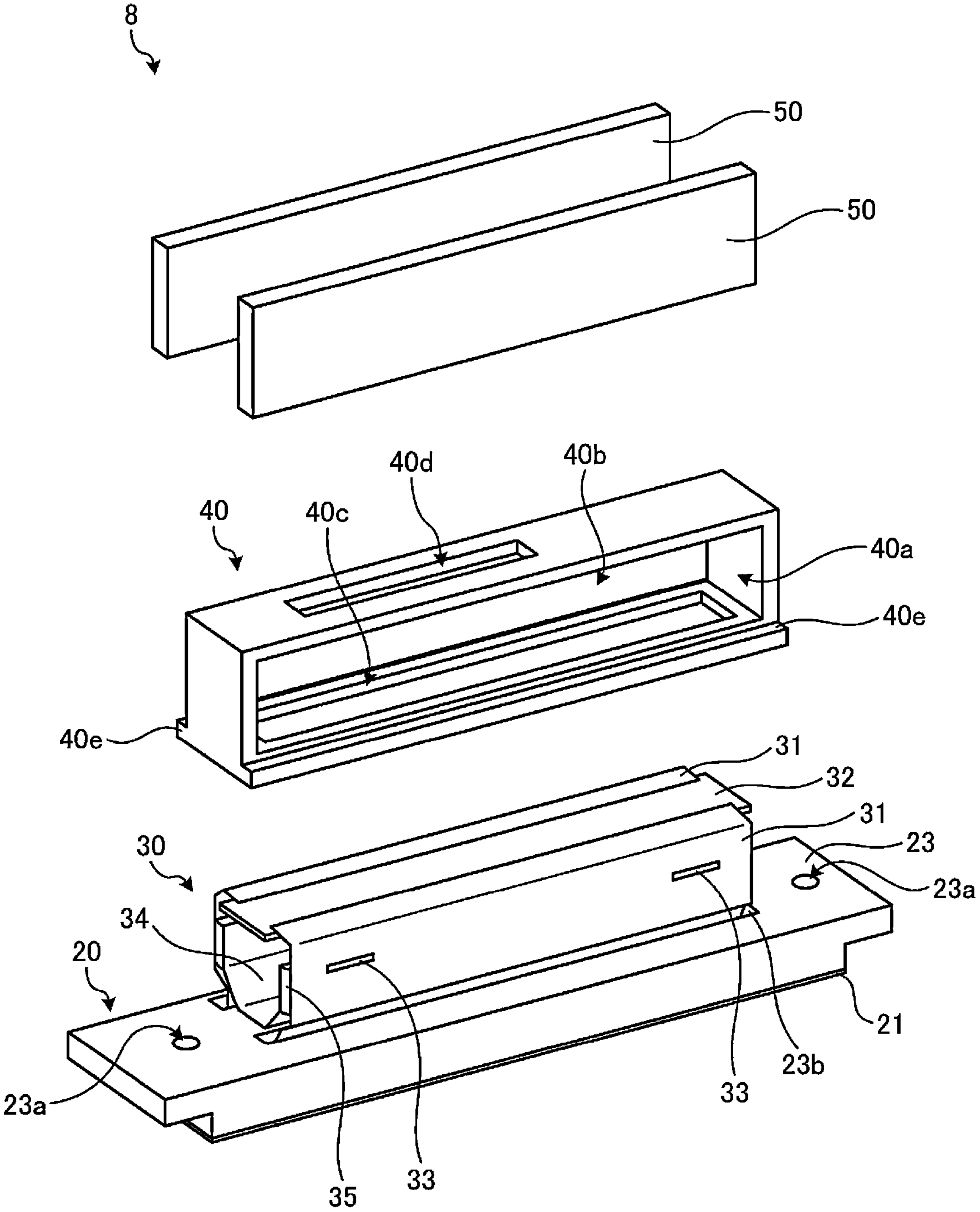
FIG. 3 is an exploded perspective view illustrating an overall configuration of a liquid discharge head according to an embodiment.

Next, the configuration of the liquid discharge head 8 according to an embodiment will be described using FIG. 3. FIG. 3 is an exploded perspective view illustrating an overall configuration of the liquid discharge head 8 according to an embodiment.

The liquid discharge head 8 includes the head body 20, a wiring portion 30, a housing 40, and a pair of heat radiating plates 50. The head body 20 includes the channel member 21, a piezoelectric actuator substrate 22 (see FIG. 4), and a reservoir 23.

In the following description, for convenience, the direction in which the head body 20 is provided in the liquid discharge head 8 may be represented as “lower”, and the direction in which the housing 40 is provided with respect to the head body 20 may be represented as “upper”.

The channel member 21 of the head body 20 has a substantially flat plate shape, and includes a first surface 21*a* (see FIG. 6), which is one main surface, and the second surface 21*b* (see FIG. 6) located at an opposite side to the first surface 21*a*. The first surface 21*a* includes an opening 61*a* (see FIG. 4), and a liquid is supplied into the channel member 21 from the reservoir 23 via the opening 61*a*.

A plurality of the discharge holes 63 (see FIG. 4) configured to discharge a liquid onto the printing sheet P are provided at the second surface 21*b*. A channel through which a liquid flows from the first surface 21*a* to the second surface 21*b* is formed inside the channel member 21.

The piezoelectric actuator substrate 22 is located on the first surface 21*a* of the channel member 21. The piezoelectric actuator substrate 22 includes a plurality of displacement elements 70 (see FIG. 6). In addition, the piezoelectric actuator substrate 22 is electrically connected to a flexible substrate 31 of the wiring portion 30.

The reservoir 23 is disposed on the piezoelectric actuator substrate 22. The reservoir 23 includes an opening 23*a* at each of both end portions thereof in the main scanning direction. The reservoir 23 includes a channel therein, and is supplied with a liquid from the outside through the opening 23*a*. The reservoir 23 has a function of supplying the liquid to the channel member 21 and a function of storing the liquid to be supplied.

The wiring portion 30 includes the flexible substrate 31, a wiring board 32, a plurality of driver ICs 33, a pressing member 34, and an elastic member 35. The flexible substrate 31 has a function of transferring a predetermined signal sent from the outside to the head body 20. Note that, as illustrated in FIG. 3, the liquid discharge head 8 according to an embodiment includes two flexible substrates 31.

The flexible substrate 31 has one end portion electrically connected to the piezoelectric actuator substrate 22 of the head body 20. The other end portion of the flexible substrate 31 is drawn upward in a manner to be inserted through a slit 23*b* of the reservoir 23, and is electrically connected to the wiring board 32. This enables the piezoelectric actuator substrate 22 of the head body 20 and the outside to be electrically connected.

The wiring board 32 is located above the head body 20. The wiring board 32 has a function of distributing signals to the plurality of driver ICs 33.

The plurality of driver ICs 33 are provided on one main surface of the flexible substrate 31. As illustrated in FIG. 3, in the liquid discharge head 8 according to an embodiment, two driver ICs 33 are provided on each flexible substrate 31, but the number of the driver ICs 33 provided on each flexible substrate 31 is not limited to two.

The driver IC 33 drives the piezoelectric actuator substrate 22 of the head body 20 on the basis of a signal transmitted from the controller 14 (see FIG. 1). With this configuration, the driver IC 33 drives the liquid discharge head 8.

The pressing member 34 has a substantially U-shape in a cross-sectional view, and is configured to press the driver ICs 33 on the flexible substrate 31 toward the heat radiating plate 50 from the inner side. With this configuration, the embodiment enables heat generated when the driver IC 33 drives to be efficiently dissipated to the heat radiating plate 50 on the outer side.

The elastic member 35 is disposed in a manner to be in contact with an outer wall of a pressing portion not illustrated in the pressing member 34. By providing such an elastic member 35, it is possible to reduce the likelihood of the pressing member 34 causing breakage of the flexible substrate 31 when the pressing member 34 presses the driver ICs 33.

The elastic member 35 is made of, for example, double-sided foam tape or the like. In addition, for example, by using a non-silicon-based thermal conductive sheet as the elastic member 35, it is possible to improve the heat radiating properties of the driver IC 33. Note that the elastic member 35 does not necessarily have to be provided.

The housing 40 is disposed on the head body 20 in a manner to cover the wiring portion 30. This enables the wiring portion 30 to be sealed with the housing 40. The housing 40 is made of, for example, a resin or a metal or the like.

The housing 40 has a box shape elongated in the main scanning direction, and includes a first opening 40*a* and a second opening 40*b* at a pair of side surfaces opposed along the main scanning direction, respectively. In addition, the housing 40 includes a third opening 40*c* at a lower surface, and a fourth opening 40*d* at an upper surface.

One of the heat radiating plates 50 is disposed on the first opening 40*a* in a manner to close the first opening 40*a*. The other of the heat radiating plates 50 is disposed on the second opening 40*b* in a manner to close the second opening 40*b*.

The heat radiating plates 50 are provided in a manner to extend in the main scanning direction, and are made of a metal, an alloy, or the like having a high heat radiating properties. The heat radiating plates 50 are provided in a manner to be in contact with the driver ICs 33, and have a function of radiating heat generated by the driver ICs 33.

The pair of heat radiating plates 50 are each fixed to the housing 40 with a screw that is not illustrated. Thus, the housing 40 to which the heat radiating plates 50 are fixed has a box shape in which the first opening 40*a* and the second opening 40*b* are closed and the third opening 40*c* and the fourth opening 40*d* are open.

The third opening 40*c* is provided in a manner to be opposed to the reservoir 23. The flexible substrate 31 and the pressing member 34 are inserted into the third opening 40*c*.

The fourth opening 40*d* is provided in order to insert a connector (not illustrated) provided on the wiring board 32. It is preferable that a portion between the connector and the fourth opening 40*d* is sealed using resin or the like. This makes it possible to suppress entry of a liquid, dust, or the like into the housing 40.

Furthermore, the housing 40 includes heat insulating portions 40*e*. The heat insulating portions 40*e* are respectively provided in a manner to be adjacent to the first opening 40*a* and the second opening 40*b*, and are provided in a manner to protrude outward from side surfaces of the housing 40 along the main scanning direction.

In addition, the heat insulating portions 40*e* are formed in a manner to extend in the main scanning direction. That is, the heat insulating portions 40*e* are located between the heat radiating plates 50 and the head body 20. By providing the housing 40 with the heat insulating portions 40*e* in this manner, it is possible to suppress transfer of heat generated by the driver ICs 33 through the heat radiating plates 50 to the head body 20.

Note that FIG. 3 illustrates an example of the configuration of the liquid discharge head 8, which may further include a member other than the members illustrated in FIG. 3.

Configuration of Head Body

Figure 4:
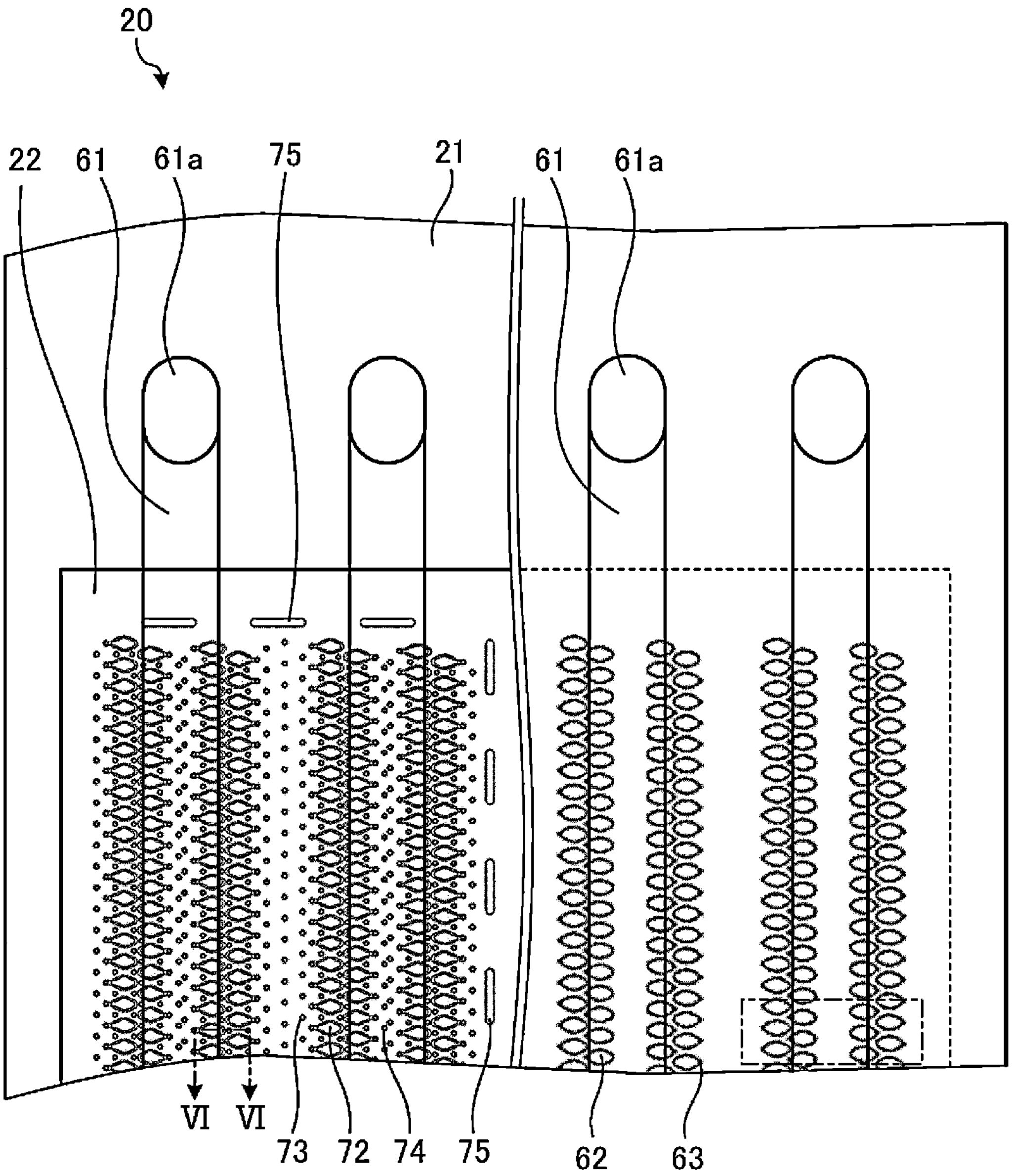
FIG. 4 is an enlarged plan view of a head body according to an embodiment.
Figure 5:
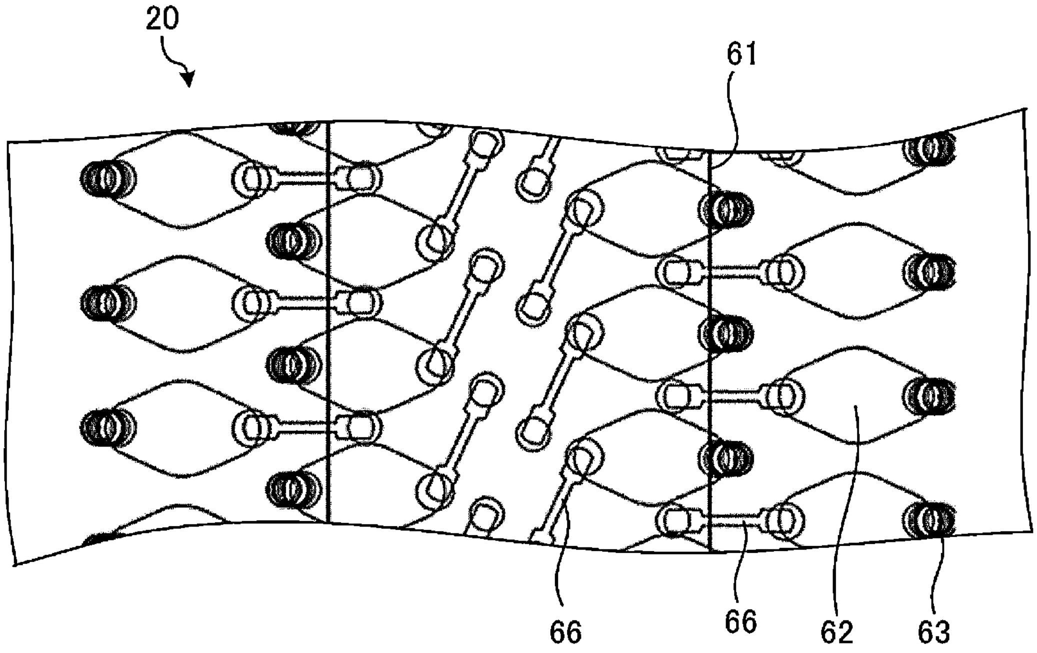
FIG. 5 is an enlarged view of a region enclosed by the one-dot dashed line in FIG. 4.
Figure 6:
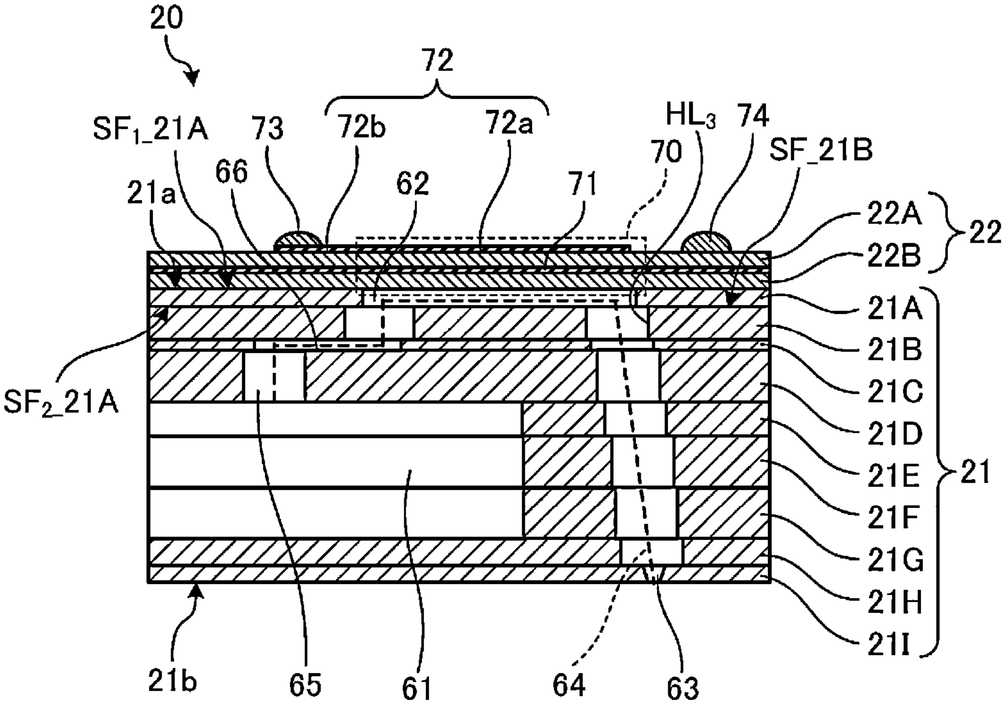
FIG. 6 is a cross-sectional view taken along the line VI-VI illustrated in FIG. 4.

Next, the configuration of the head body 20 according to an embodiment will be described using FIGS. 4 to 6. FIG. 4 is an enlarged plan view of the head body 20 according to an embodiment. FIG. 5 is an enlarged view of a region enclosed by the one dot-dashed line in FIG. 4. FIG. 6 is a cross-sectional view taken along the line VI-VI illustrated in FIG. 4.

As illustrated in FIG. 4, the head body 20 includes the channel member 21 and the piezoelectric actuator substrate 22. The channel member 21 includes supply manifolds 61, a plurality of pressurizing chambers (cavities) 62, and the plurality of discharge holes 63. In the following description, in the head body 20, the liquid discharging side may be referred to as a front end, and the side opposite to the liquid discharging side may be referred to as a back end.

The plurality of pressurizing chambers 62 are connected to the supply manifolds 61. The plurality of discharge holes 63 are each connected to corresponding one of the plurality of pressurizing chambers 62.

Each of the pressurizing chambers 62 is open to the first surface 21*a* (see FIG. 6) of the channel member 21. Furthermore, the first surface 21*a* of the channel member 21 includes the opening 61*a* communicating with the supply manifold 61. In addition, a liquid is supplied from the reservoir 23 (see FIG. 2) through the opening 61*a* to the inside of the channel member 21.

In the example illustrated in FIG. 4, the head body 20 includes four supply manifolds 61 located inside the channel member 21. Each of the supply manifolds 61 has a long thin shape extending along the longitudinal direction (that is, in the main scanning direction) of the channel member 21. At each of both ends of the supply manifold 61, the opening 61*a* of the supply manifold 61 is formed on the first surface 21*a* of the channel member 21.

In the channel member 21, the plurality of pressurizing chambers 62 are formed in a manner to expand two-dimensionally. As illustrated in FIG. 5, each of the pressurizing chambers 62 is a hollow region having a substantially diamond planar shape with corner portions being rounded. The pressurizing chamber 62 is open at the first surface 21*a* of the channel member 21, and is closed by the piezoelectric actuator substrate 22 being bonded to this first surface 21*a*.

The pressurizing chambers 62 form a pressurizing chamber row arrayed in the longitudinal direction. The pressurizing chambers 62 of pressurizing chamber rows are arranged in a staggered manner between two adjacent pressurizing chamber rows, which constitutes a pressurizing chamber group. In the example illustrated in FIG. 4, the channel member 21 includes eight pressurizing chamber groups.

Furthermore, relative arrangement of the pressurizing chambers 62 within each pressurizing chamber group is configured in the same manner, and the pressurizing chamber groups are arranged in a manner such that they are slightly shifted from each other in the longitudinal direction.

The discharge holes 63 are disposed at positions of the channel member 21 other than regions opposed to the supply manifolds 61. That is, in a transparent view of the channel member 21 from the first surface 21*a* side, the discharge holes 63 do not overlap with the supply manifolds 61.

Furthermore, in a plan view, the discharge holes 63 are disposed within a region mounting the piezoelectric actuator substrate 22. Such discharge holes 63 as one group occupy a region having approximately the same size and shape as the piezoelectric actuator substrate 22.

Then, by displacing a corresponding displacement element 70 (see FIG. 6) of the piezoelectric actuator substrate 22, droplets are discharged from the discharge hole 63.

As illustrated in FIG. 6, the channel member 21 has a layered structure layering a plurality of plates. These plates include a cavity plate 21A, a base plate 21B, an aperture (restriction) plate 21C, a supply plate 21D, manifold plates 21E, 21F, and 21G, a cover plate 21H, and a nozzle plate 21I arranged in this order from the upper surface of the channel member 21.

FIG. 6 illustrates an example of the layered structure of each plate according to an embodiment, and there is no need to be particularly limited to the example illustrated in FIG. 6. For example, manifold plates 21E, 21F, and 21G may be formed by layering three or more plates. The cover plate 21H may be formed by layering a plurality of plates.

A number of holes are formed in the plates. The thickness of each plate is approximately 10 μm to 300 μm. Thus, the accuracy of forming the hole can be improved. The plates are aligned and layered such that the holes communicate with each other to form a predetermined channel.

Also, the channel member 21 and the piezoelectric actuator substrate 22 may be bonded together by an adhesive. At this time, as will be described later using FIGS. 8 to 11, for example, the cavity plate 21A includes a release groove on its surface (a contact region with the piezoelectric actuator substrate 22) for releasing the excess adhesive. The release groove is provided to avoid many holes.

In the channel member 21, the supply manifold 61 and the discharge hole 63 communicate through an individual channel 64. The supply manifolds 61 are located on the second surface 21*b* side within the channel member 21, and the discharge holes 63 are located at the second surface 21*b* of the channel member 21.

The individual channel 64 includes the pressurizing chamber 62 and an individual supply channel 65. The pressurizing chamber 62 is located at the first surface 21*a* of the channel member 21. The individual supply channel 65 serves as a channel that connects the supply manifold 61 and the pressurizing chamber 62.

In addition, the individual supply channel 65 includes a restriction portion 66 having a width narrower than other portions. The restriction portion 66 has a width narrower than other portions of the individual supply channel 65, and hence, has a high channel resistance. In this manner, when the channel resistance of the restriction portion 66 is high, pressure occurring at the pressurizing chamber 62 is less likely to be released to the supply manifold 61.

The piezoelectric actuator substrate 22 includes piezoelectric ceramic layers 22A and 22B, a common electrode 71, an individual electrode 72, a connecting electrode 73, a dummy connecting electrode 74, and a surface electrode 75 (see FIG. 4).

The piezoelectric actuator substrate 22 includes the piezoelectric ceramic layer 22A, the common electrode 71, the piezoelectric ceramic layer 22B, and the individual electrode 72 layered in this order.

Both of the piezoelectric ceramic layers 22A and 22B each extend over the first surface 21*a* of the channel member 21 in a manner to extend across the plurality of pressurizing chambers 62. The piezoelectric ceramic layers 22A and 22B each have a thickness of approximately 20 μm. For example, the piezoelectric ceramic layers 22A and 22B are made of a lead zirconate titanate (PZT)-based ceramic material having ferroelectricity.

The common electrode 71 is formed over substantially the entire surface in a surface direction of a region between the piezoelectric ceramic layer 22A and the piezoelectric ceramic layer 22B. That is, the common electrode 71 overlaps with all the pressurizing chambers 62 in the region opposed to the piezoelectric actuator substrate 22.

The thickness of the common electrode 71 is approximately 2 μm. For example, the common electrode 71 is made of a metal material such as a Ag—Pd based material.

The individual electrode 72 includes a body electrode 72*a* and a drawn electrode 72*b*. The body electrode 72*a* is located in a region opposed to the pressurizing chamber 62, of the piezoelectric ceramic layer 22A. The body electrode 72*a* is slightly smaller than the pressurizing chamber 62, and has a shape substantially similar to that of the pressurizing chamber 62.

The drawn electrode 72*b* is drawn out from the body electrode 72*a* to be outside the region opposed to the pressurizing chamber 62. The individual electrode 72 is made of, for example, a metal material such as an Au-based material.

The connecting electrode 73 is located on the drawn electrode 72*b*, and is formed to have a convex shape with a thickness of approximately 15 μm. The connecting electrode 73 is electrically connected to an electrode provided at the flexible substrate 31 (see FIG. 3). The connecting electrode 73 is made of, for example, silver-palladium, including glass frit.

The dummy connecting electrode 74 is located on the piezoelectric ceramic layer 22A and is positioned in a manner not to overlap with various electrodes such as the individual electrodes 72. The dummy connecting electrode 74 connects the piezoelectric actuator substrate 22 and the flexible substrates 31, and increases the connection strength.

Furthermore, the dummy connecting electrode 74 makes uniform the distribution of the contact positions between the piezoelectric actuator substrate 22 and the piezoelectric actuator substrate 22, and stabilizes the electrical connection. The dummy connecting electrode 74 is preferably made of a material equivalent to that of the connecting electrode 73, and is preferably formed in a process equivalent to that of the connecting electrode 73.

The surface electrode 75 illustrated in FIG. 4 is formed on the piezoelectric ceramic layer 22A and at a position not interfering with the individual electrode 72. The surface electrode 75 is connected to the common electrode 71 through a via hole formed in the piezoelectric ceramic layer 22B.

With this configuration, the surface electrode 75 is grounded and maintained at the ground electric potential. The surface electrode 75 is preferably made of a material equivalent to that of the individual electrode 72, and is preferably formed in a process equivalent to that of the individual electrode 72.

A plurality of the individual electrodes 72 are individually electrically connected to the controller 14 (see FIG. 1) via the flexible substrate 31 and the wirings, in order to individually control the electric potential. By setting the individual electrode 72 and the common electrode 71 to have different electric potentials, and applying an electric field in the polarization direction of the piezoelectric ceramic layer 22A, the portion of the piezoelectric ceramic layer 22A to which the electric field is applied operates as an active section distorted due to a piezoelectric effect.

In other words, in the piezoelectric actuator substrate 22, portion opposed to the pressurizing chamber 62 in the individual electrode 72, the piezoelectric ceramic layer 22A, and the common electrode 71, function as the displacement element 70.

Then, unimorph deformation of the displacement element 70 results in the pressurizing chamber 62 being pressed and a liquid being discharged from the discharge hole 63.

Next, a drive procedure of the liquid discharge head 8 according to an embodiment will be described. The individual electrode 72 is set to have a higher electric potential (hereinafter, represented as a "high electric potential") than the common electrode 71 in advance. Then, each time a discharge request is made, the individual electrode 72 is once set to have the same electric potential (hereinafter, represented as a "low electric potential") as the common electrode 71, and then is again set to have the high electric potential at a predetermined timing.

With this configuration, at the timing when the individual electrode 72 changes to have the low electric potential, the piezoelectric ceramic layers 22A and 22B return to their original shapes, and the volume of the pressurizing chamber 62 increases more than the initial state, that is, more than the state of the high electric potential.

At this time, since negative pressure is applied to the inside of the pressurizing chamber 62, a liquid in the supply manifold 61 is sucked into the interior of the pressurizing chamber 62.

After this, the piezoelectric ceramic layers 22A and 22B deform in a manner to protrude toward the pressurizing chamber 62 at the timing when the individual electrode 72 is again set to have the high electric potential.

In other words, the inside of the pressurizing chamber 62 has a positive pressure as a result of a reduction in the volume of the pressurizing chamber 62. Thus, the pressure of the liquid within the pressurizing chamber 62 rises, and droplets are discharged from the discharge hole 63.

In other words, in order to discharge droplets from the discharge hole 63, the controller 14 supplies a driving signal including pulses based on the high electric potential to the individual electrode 72 using the driver IC 33. The pulse width may be set to an acoustic length (AL) that is a length of time when a pressure wave propagates from the restriction portion 66 to the discharge hole 63.

With this configuration, when the inside of the pressurizing chamber 62 changes from the negative pressure state to the positive pressure state, the both pressures are combined to make it possible to discharge the droplets with higher pressure.

In addition, in a case of gradation printing, the gradation level is expressed based on the number of droplets continuously discharged from the discharge hole 63, that is, the amount (volume) of droplets adjusted based on the number of times the droplets are discharged. Thus, the droplets are discharged for the number of times corresponding to the designated gradation level to be expressed, through the discharge hole 63 corresponding to the designated dot region.

In general, when the liquid discharge is continuously performed, an interval between the pulses that are supplied to discharge the droplets may be set to the AL. Due to this, a period of a residual pressure wave of pressure generated in discharging the droplets discharged earlier matches a period of a pressure wave of pressure to be generated in discharging droplets to be discharged later.

Thus, the residual pressure wave and the pressure wave are superimposed, whereby the droplets can be discharged with a higher pressure. Note that in this case, the speed of the droplets to be discharged later is increased, and the impact points of the plurality of droplets become close.

Details of Plates

Figure 7:
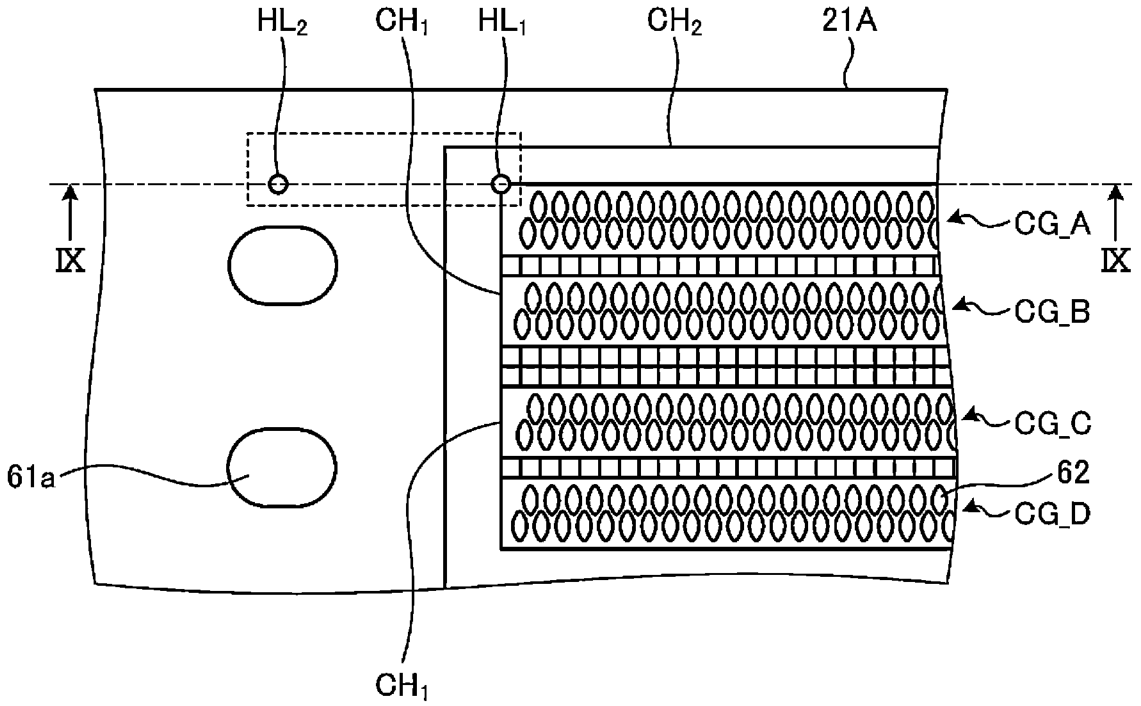
FIG. 7 is an enlarged plan view of a partial plane of a cavity plate.
Figure 8:
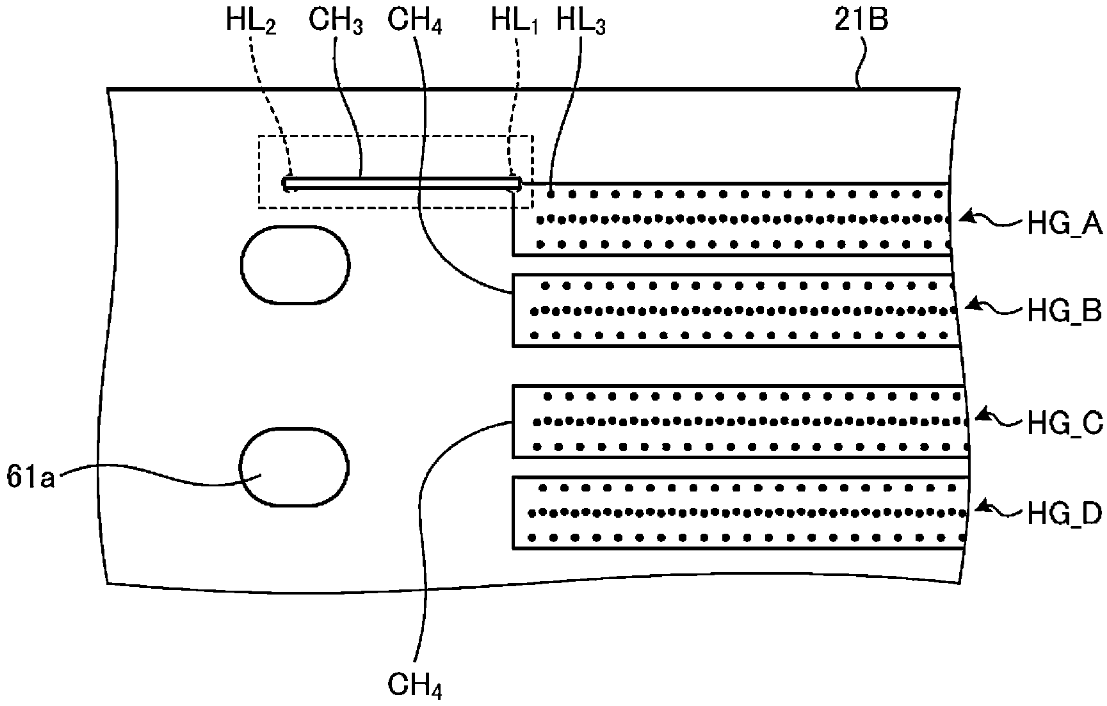
FIG. 8 is an enlarged plan view of a partial plane of a base plate.
Figure 9:
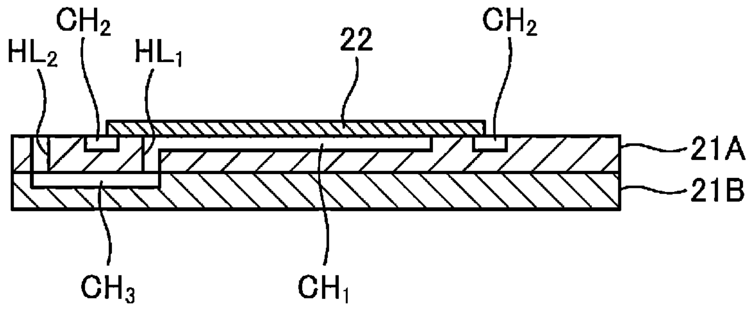
FIG. 9 is a cross-sectional view taken along the line IX-IX illustrated in FIG. 7.
Figure 10:
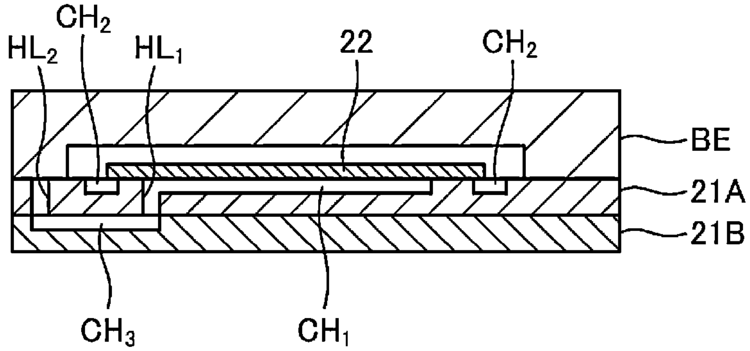
FIG. 10 is a partial cross-sectional view illustrating an example of an installation for a channel member.
Figure 11:
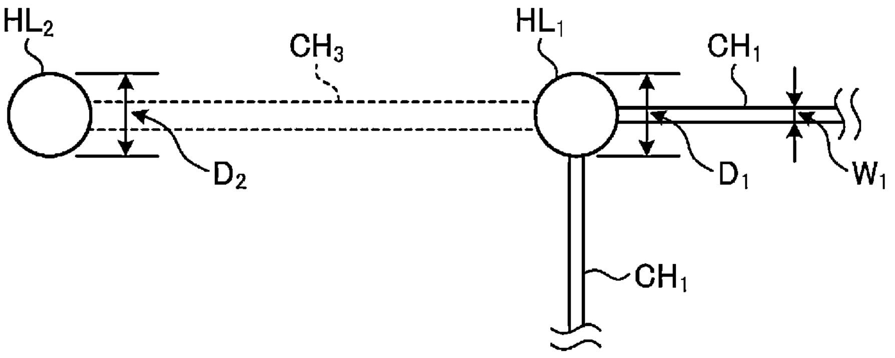
FIG. 11 is a partially enlarged plan view of a portion enclosed by the dotted line in FIG. 7.

Details of plates according to an embodiment will be described using FIGS. 7 to 11. FIG. 7 is an enlarged plan view of a partial plane of the cavity plate 21A. FIG. 8 is an enlarged plan view of a partial plane of the base plate 21B. FIG. 9 is a cross-sectional view taken along the line IX-IX illustrated in FIG. 7. FIG. 10 is a partial cross-sectional view illustrating an example of an installation for a channel member. FIG. 11 is a view illustrating details of a peripheral structure of a release groove.

As illustrated in FIG. 7, the cavity plate 21A includes, in the lateral direction of the cavity plate 21A, a plurality of cavity groups (CG_A, CG_B, CG_C, CG_D) including a plurality of pressurizing chambers (cavities) 62 arranged in the longitudinal direction of the cavity plate 21A. Additionally, as illustrated in FIG. 7, the cavity plate 21A includes a first groove $CH_1$ and a second groove $CH_2$ for releasing the adhesive for bonding the cavity plate 21A and the piezoelectric actuator substrate 22.

The first groove $CH_1$ is located inside the contact region with the piezoelectric actuator substrate 22 as illustrated in FIG. 9. The first groove $CH_1$ is provided on the surface of the cavity plate 21A (the contact region with the piezoelectric actuator substrate 22) by half-etching. The first groove $CH_1$ is located in a manner to surround the cavity groups (CG_A, CG_B, CG_C, CG_D) illustrated in FIG. 7, for example. The first groove $CH_1$ is formed in a lattice pattern between the cavity groups. The surface area is increased by this lattice pattern to secure a space for accommodating as much adhesive as possible.

Further, a first hole $HL_1$ that leads to a third groove $CH_3$ (see FIG. 8) provided in the base plate 21B is bored in the first groove $CH_1$. For example, the first hole $HL_1$ is a through hole which penetrates the cavity plate 21A in a direction perpendicular (thickness direction) to the longitudinal direction of the cavity plate 21A from the surface of the cavity plate 21A (the contact region with the piezoelectric actuator substrate 22). The first hole $HL_1$ is located along the lateral direction of the cavity plate 21A alongside the opening 61*a* to which the liquid is supplied from the back end.

The second groove $CH_2$ is located in a manner to surround the contact region in the cavity plate 21A, with the piezoelectric actuator substrate 22. The second groove $CH_2$ is provided on the surface of the cavity plate 21A (the contact region with the piezoelectric actuator substrate 22) by half-etching.

Further, as illustrated in FIG. 7 or FIG. 9, in the cavity plate 21A, a second hole $HL_2$ that leads to the third groove $CH_3$ (see FIG. 8) provided in the base plate 21B is bored outside the contact region with the piezoelectric actuator substrate 22. For example, the second hole $HL_2$ is a through hole through the cavity plate 21A, same as the first hole $HL_1$.

It should be noted that the second hole $HL_2$ may be provided at any position on the cavity plate 21A, when provided outside the contact region, unless there are any design constraints or the like.

As illustrated in FIG. 8, the base plate 21B includes the third groove $CH_3$ for opening the first groove $CH_1$ to the atmosphere. The third groove $CH_3$ is located in the contact region with cavity plate 21A. The third groove $CH_3$ has a length connecting at least the first hole $HL_1$ and the second hole $HL_2$.

The third groove $CH_3$ is bored in the cavity plate 21A and communicates between the first groove $CH_1$ and the outside, through the first hole $HL_1$ communicating with the first groove $CH_1$, and the second hole $HL_2$ located outside the contact region between the cavity plate 21A and the piezoelectric actuator substrate 22. Gases generated during adhesive bonding between the piezoelectric actuator substrate 22 and the cavity plate 21A are discharged to the outside through the first hole $HL_1$, the third groove $CH_3$, and the second hole $HL_2$.

Further, as illustrated in FIG. 8, the base plate 21B includes a plurality of through hole groups (HG_A, HG_B, HG_C, HG_D) composed of a plurality of through holes $HL_3$ located in regions corresponding to the cavity groups of the cavity plate 21A in the lateral direction of the base plate 21B. Additionally, the base plate 21B has a plurality of fourth grooves $CH_4$ each located to surround the through hole group. Note that the through hole $HL_3$ leads to the discharge hole 63 (see FIG. 6).

Further, as illustrated in FIG. 10, the second hole $HL_2$ is sealed by a channel member BE installed in the front end including the cavity plate 21A and the base plate 21B. The channel member BE is located above the piezoelectric actuator substrate 22. This prevents the liquid (e.g., ink supplied from the back end to the front end) supplied to the head body 20 from entering the third groove $CL_3$ or the first groove $CH_1$ through the second hole $HL_2$. The first hole $HL_1$ is located along the lateral direction of the cavity plate 21A, alongside the opening 61*b* to which the liquid is supplied from the back end. Thus, since the second hole $HL_2$ is necessarily sealed by installing the channel member BE, the position of the second hole $HL_2$ need not be considered when installing the channel member BE, and the second hole $HL_2$ can be easily sealed.

Figure 12:
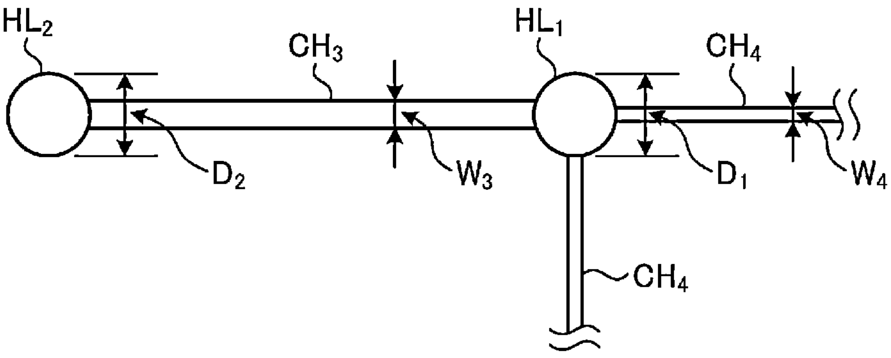
FIG. 12 is a partially enlarged plan view of a portion enclosed by the dotted line in FIG. 8.

An example of a magnitude correlation between the first hole $HL_1$ and the second hole $HL_2$, a width of the first groove $CH_1$ and the third groove $CL_3$ will be described using FIGS. 11 and 12. FIG. 11 is a partially enlarged plan view of a portion enclosed by the dotted line in FIG. 7. FIG. 12 is a partially enlarged plan view of a portion enclosed by the dotted line in FIG. 8. As illustrated in FIGS. 11 and 12, a hole diameter $D_1$ of the first hole $HL_1$ may be greater than a width D of the first groove $CH_1$ and the width of the third groove $CL_3$. The hole diameter $D_2$ of the second hole $HL_2$ may be larger than the width of the third groove $CL_3$. Thus, the first hole $HL_1$, the first groove $CH_1$ and the third groove $CL_3$, as well as, the second hole $HL_2$ and the third groove $CL_3$, can be surely communicated with each other even when the etching deviation in the manufacturing of the first hole $HL_1$ and the second hole $HL_2$ and the layering deviation between the cavity plate 21A and the base plate 21B occur.

Figure 13:
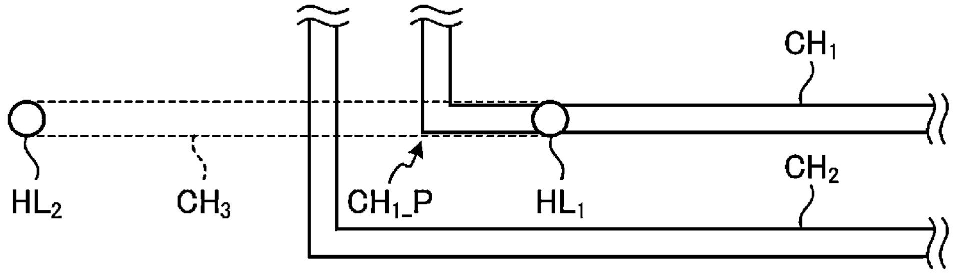
FIG. 13 is a view illustrating details of a peripheral structure of a release groove.

As illustrated in FIG. 13, the first hole $HL_1$ may be provided in the first groove $CH_1$, avoiding a corner portion $CH_1$_P of the first groove $CH_1$. Although the corner portion $CH_1$_P is a place where the adhesive flows in from two directions and the adhesive tends to stay, the first hole $HL_1$ can be prevented from being clogged by the adhesive by providing the first hole $HL_1$ avoiding the corner portion $CH_1$_P.

MODIFIED EXAMPLE

Figure 14:
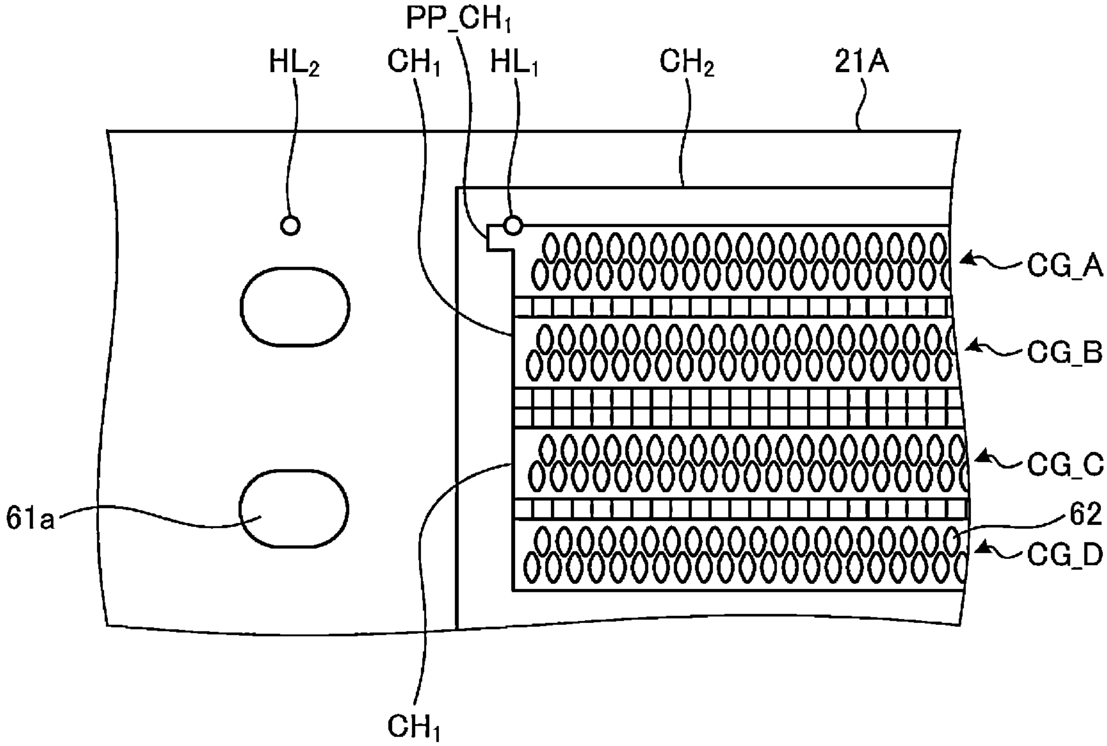
FIG. 14 is an enlarged plan view of a partial plane of a cavity plate according to a modified example.

FIG. 14 is an enlarged plan view of a partial plane of a cavity plate according to a modified example. As illustrated in FIG. 14, the first groove $CH_1$ may include a protruding portion PP_$CH_1$ protruding in the longitudinal direction of the cavity plate 21A, and the first hole $HL_1$ may be located avoiding the protruding portion PP_$CH_1$ Also in this case, clogging of the first hole $HL_1$ by the adhesive can be prevented.

Figure 15:
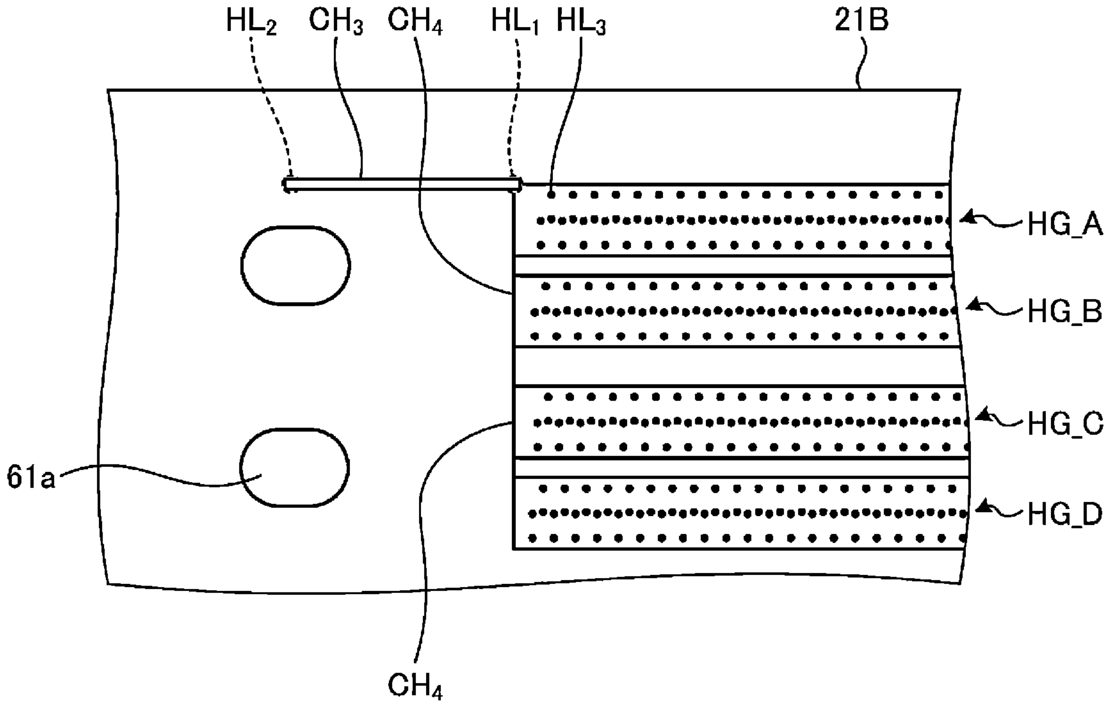
FIG. 15 is an enlarged plan view of a partial plane of a base plate according to a modified example.

FIG. 15 is an enlarged plan view of a partial plane of a base plate according to a modified example. As illustrated in FIG. 15, the plurality of fourth grooves $CH_4$ may be configured such that the adjacent fourth grooves $CH_4$ are connected to each other at positions extended, in the lateral direction of the base plate 21B, from a position of connecting the third groove $CH_3$ and the first hole $HL_1$. Also in such a case, it is difficult for air to remain inside the fourth groove $CH_4$.

The adjacent fourth grooves $CH_4$ may or may not be connected to each other at the center of the base plate 21B in the longitudinal direction.

Although the third groove $CH_3$ and the fourth groove $CH_4$ are located inside the contact region with the cavity plate 21A in the base plate 21B in a plan view, the present disclosure is not limited thereto. Third groove $CH_3$ and the fourth groove $CH_4$ may be located on a plane of the base plate 21B, opposite to the plane abutting the cavity plate 21A.

REFERENCE SIGNS LIST

1 Printer
4 Applicator
6 Transport roller
7 Frame
8 Liquid discharge head
10 Dryer
14 Controller
20 Head body
21 Channel member
22 Piezoelectric actuator substrate
23 Reservoir
23*a* Opening
23*b* Slit
31 Flexible substrate
32 Wiring board
33 Driver IC
63 Discharge hole
P Printing sheet
$CH_1$ First groove
$CH_2$ Second groove
$CH_3$ Third groove
$HL_1$ First hole
$HL_2$ Second hole
$CH_1$_P Corner portion
PP_$CH_1$ Protruding portion

The invention claimed is:

1. A liquid discharge head, comprising:

a base plate;

a cavity plate located on the base plate and comprising a cavity; and a piezoelectric actuator substrate located on the cavity plate, the cavity plate comprising a first groove located inside a contact region with the piezoelectric actuator substrate and configured to release an adhesive for bonding the cavity plate and the piezoelectric actuator substrate, and a second groove located in a manner to surround the contact region with the piezoelectric actuator substrate and configured to release the adhesive, the base plate comprising a third groove configured to open the first groove to an atmosphere, and the third groove being configured to communicate between the first groove and an outside through a first hole communicating with the first groove and a second hole located outside the contact region of the cavity plate and the piezoelectric actuator substrate.

2. The liquid discharge head according to claim 1, wherein the third groove is located in a contact region with the cavity plate.

3. The liquid discharge head according to claim 1, further comprising:

a channel member located on the piezoelectric actuator substrate, wherein the second hole is sealed by the channel member.

4. The liquid discharge head according to claim 1, wherein a hole diameter of the first hole is greater than a width of the first groove.

5. The liquid discharge head according to claim 1, wherein a hole diameter of the first hole is greater than a width of the third groove.

6. The liquid discharge head according to claim 1, wherein a hole diameter of the second hole is larger than a width of the third groove.

7. The liquid discharge head according to claim 1, wherein the first hole is located avoiding a corner portion of the first groove.

8. The liquid discharge head according to claim 1, wherein the cavity plate comprises, in a lateral direction of the cavity plate, a plurality of cavity groups each comprising a plurality of the cavities arranged in a longitudinal direction of the cavity plate, and the first groove is located in a manner to surround the cavity groups.

9. The liquid discharge head according to claim 7, wherein the first groove comprises a protruding portion protruding in the longitudinal direction of the cavity plate, and the first hole is located avoiding the protruding portion.

10. The liquid discharge head according to claim 8, wherein the base plate comprises a plurality of through hole groups located in a region corresponding to the cavity groups in a lateral direction of the base plate, and the base plate comprises a plurality of fourth grooves located in a manner to surround the through hole groups.

11. The liquid discharge head according to claim 10, wherein the plurality of fourth grooves are configured such that the fourth grooves that are adjacent are connected to each other at positions extended, in the lateral direction of the base plate, from a position of connecting the third groove and the first hole.

12. A recording device, comprising:

the liquid discharge head according to claim 1.

* * * * *